(12) United States Patent
Gray, II (10) Patent No.: US 7,983,407 B2
(45) Date of Patent: Jul. 19, 2011

(54) CALLING PARTY NUMBER OVERRIDE FOR EMERGENCY SERVICES

(75) Inventor: Robert A. Gray, II, Garland, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1147 days.

(21) Appl. No.: 11/692,576

(22) Filed: Mar. 28, 2007

(65) Prior Publication Data

US 2008/0240371 A1    Oct. 2, 2008

(51) Int. Cl.
*H04M 3/42* (2006.01)

(52) U.S. Cl. ............... 379/207.15; 379/88.2; 379/88.21; 379/207.13; 379/207.14

(58) Field of Classification Search ............... 379/37–50, 379/88.19–88.21, 120, 142.04–142.11, 207.12–208.01; 370/352, 401

See application file for complete search history.

(56) References Cited

U.S. PATENT DOCUMENTS

| 6,415,026 | B1 * | 7/2002 | Flood | 379/215.01 |
| 7,042,338 | B1 * | 5/2006 | Weber | 340/309.5 |
| 7,305,081 | B1 * | 12/2007 | Kalmanek et al. | 379/219 |
| 7,440,442 | B2 * | 10/2008 | Grabelsky et al. | 370/352 |
| 2003/0179862 | A1 * | 9/2003 | Sierra et al. | 379/88.01 |
| 2004/0105529 | A1 * | 6/2004 | Salvucci et al. | 379/45 |
| 2005/0157853 | A1 * | 7/2005 | Andrew | 379/42 |
| 2005/0190892 | A1 * | 9/2005 | Dawson et al. | 379/37 |

OTHER PUBLICATIONS

FCC: Report on e911 Phase 2 to Congress—Mar. 2005.*

* cited by examiner

*Primary Examiner* — Curtis Kuntz
*Assistant Examiner* — Joseph J Nguyen (57) ABSTRACT

A system receives an emergency call, a local exchange carrier (LEC) charge number, and Calling Party Number (CPN) from a user device, and overrides the LEC charge number with the CPN for Automatic Number Identification (ANI) determination purposes. The system also determines the ANI of the user device based on the CPN, receives an address associated with the user device based on the ANI, and provides the emergency call and the address to a Public Safety Answering Point (PSAP).

18 Claims, 5 Drawing Sheets

| | CUSTOMER | CPN INFORMATION | OVERRIDE | CPN SCREENING |
| --- | --- | --- | --- | --- |
| | 410 | 420 | 430 | 440 |
| 450 → | Bob Smith | PHONE NO., OTHER | YES | YES |
| 460 → | Joe Blank | PHONE NO., OTHER | YES | NO |
| 470 → | Jane Doe | PHONE NO., OTHER | YES | NO |
| 480 → | Jack Sprat | PHONE NO., OTHER | YES | YES |

CALLING PARTY NUMBER OVERRIDE FOR EMERGENCY SERVICES

BACKGROUND INFORMATION

Various reseller and local exchange carrier (LEC) configurations exist where a customer's user device (e.g., a telephone, an Internet Protocol (IP) based telephone, etc.) may access a domestic switching network (e.g., a central office). Such configurations may be desired over accessing Signaling System 7 (SS7) based networks if the LEC does not wish to incur the additional costs and overhead associated with SS7 network requirements but wishes to permit transmission of call associated data (e.g., Calling Party Number (CPN) information, etc.). If a LEC maintains a toll services agreement or Equal Access capabilities with other toll service providers, the LEC may be required to provide a charge or bill-to number, associated with the LEC, in addition to the customer's CPN.

Enhanced 911 (or E911) service is a feature of the 911 emergency-calling system that automatically associates a physical address with a calling party's Automatic Number Identification (ANI). The enhanced 911 service provides emergency responders with the location of the emergency without the calling party having to provide it. A final destination of a 911 call (e.g., where the 911 operator is located) is referred to as a Public Safety Answering Point (PSAP). The CPN may be used to determine ANI information associated with the calling party. The ANI information may be used to look up an address of the calling party, associated with the ANI, in a third party Automatic Location Identification (ALI) database that is secure and separate from the public telephone network. The determined address of the calling party may be used to locate the closest PSAP to the calling party in the emergency situation. The PSAP may receive emergency (or 911) calls and associated address information, and may respond to the emergency accordingly.

However, since the LEC charge number takes precedence over the CPN of the calling party in the LEC configuration discussed above, the LEC charge number may be used to determine the ANI information that is transmitted to the third party ALI database in the event of a 911 call. The ALI database will return the address associated with ANI information of the LEC charge number instead of the address associated with the ANI information of the calling party. In such a scenario, the PSAP will be unable to determine the address information associated with the calling party because the PSAP will not have the correct address of the calling party. This may make it difficult to administer proper emergency services to a calling party in a crisis situation. Furthermore, the PSAP located closest to the address associated with the ANI information of the LEC charge number may be the first PSAP contacted by the 911 call, may not be located anywhere near the calling party, and may have to transfer the call to the PSAP closest to the calling party. Thus, the calling party may lose valuable time in receiving emergency services in a situation where time is of the essence, while the proper PSAP is located.

DETAILED DESCRIPTION

The following detailed description refers to the accompanying drawings. The same reference numbers in different drawings may identify the same or similar elements. Also, the following detailed description does not limit the invention.

Implementations described herein may enable a local exchange carrier (LEC), with access to a domestic switching network, to deliver address information of a user device to a Public Safety Answering Point (PSAP) in the event of an emergency (or 911) call from the user device. The Calling Party Number (CPN) of the user device may be used to determine Automatic Number Identification (ANI) information associated with the user device. The ANI information may be used to look up address information associated with the ANI information in a third party Automatic Location Identification (ALI) database in order to determine the address associated with the user device. The address may be used to determine a location of the closest PSAP to the user device so that the emergency call is delivered to the closest PSAP. For example, in one implementation, a customer configuration option may be provided in a switch table associated with the domestic switching network to ensure that the CPN of the user device may override a charge or bill-to number of the LEC in the event of an emergency call. Such an arrangement may ensure delivery of the user device address information to the correct and closest PSAP in the event of an emergency call by the user device. The PSAP may, in turn, provide the appropriate emergency services in a timely and efficient manner to the user of the user device.

As used herein, the terms "customer," "caller," "calling party," and/or "user" may be used interchangeably. Also, the terms "customer," "caller," "calling party," and/or "user" are intended to be broadly interpreted to include a user device or a user of a user device.

Figure 1:
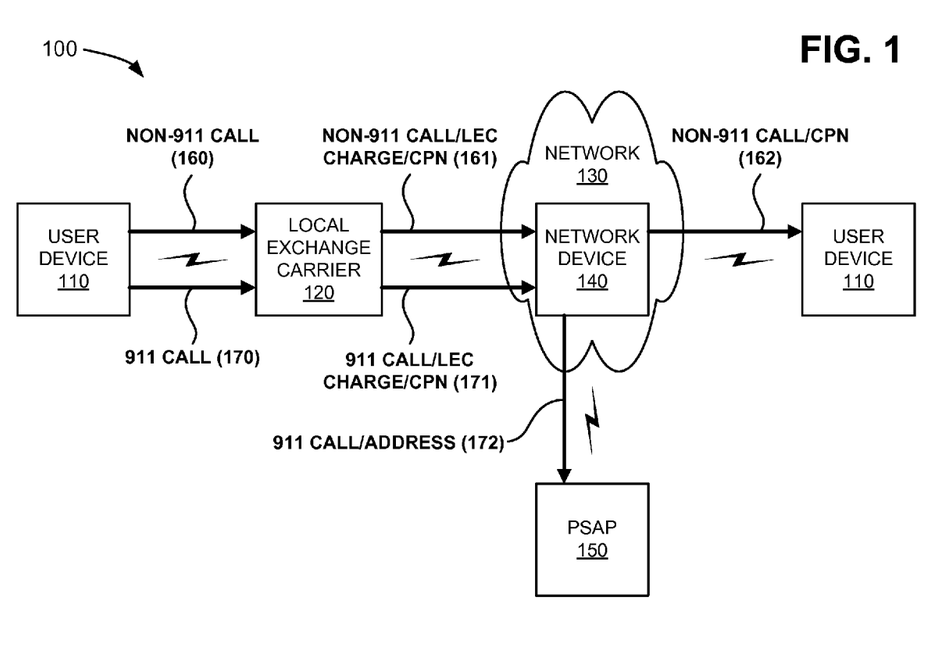
FIG. 1 is an exemplary diagram of a network in which systems and methods described herein may be implemented.

FIG. 1 is an exemplary diagram of a network 100 in which systems and methods described herein may be implemented. Network 100 may include user devices 110, a local exchange carrier (LEC) 120, and a Public Safety Answering Point (PSAP) 150 connected via a network 130 that includes a network device 140. User devices 110, local exchange carrier 120, and PSAP 150 may connect to network 130 via wired and/or wireless connections. Two user devices 110, one local exchange carrier 120, one network device 140, and one PSAP 150 have been illustrated for simplicity. In practice, there may be more user devices, local exchange carriers, network devices, and/or PSAPs. Also, in some instances, a user device may perform one or more functions of a local exchange carrier and a local exchange carrier may perform one or more functions of a user device. In other instances, a local exchange carrier may perform one or more functions of a network device and a network device may perform one or more functions of a local exchange carrier.

Each user device 110 may include one or more entities. An entity may be defined as a device, such as a Plain Old Telephone Service (POTS) telephone, a personal computer, a laptop, or another type of computation or communication device, a thread or process running on one of these devices, and/or an object executable by one of these devices. In one implementation, user device 110 may enable a user to make emergency (or 911) calls and/or non-emergency (or non-911) calls in a manner described herein.

Local exchange carrier 120 may include one or more entities that manage local telephone lines and switches, and provision local phone services within a business area, as well as long-distance calls originating or terminating in the business area. For example, in one implementation, local exchange carrier 120 may establish emergency or non-emergency telephone calls and/or establish other communication services carried by telephone lines in a manner described herein. In still another implementation, local exchange carrier 120 may include one or more servers, network devices, and/or combinations of networks (e.g., a telephone network, such as the Public Switched Telephone Network (PSTN) or a cellular telephone network) that provide local phone services.

Network 130 may include a local area network (LAN), a wide area network (WAN), a metropolitan area network (MAN), a telephone network, such as the Public Switched Telephone Network (PSTN) or a cellular telephone network, an intranet, the Internet, or a combination of networks. In one implementation, network 130 may include a Class 5 domestic switching network that provides services, such as basic dialtone, calling features, and additional digital and data services to subscribers (e.g., local exchange carriers). In another implementation, network 130 may include other domestic switching networks, such as a Signaling System 7 (SS7) network. In a further implementation, network 130 may include an ISDN PRI that provides network access to local exchange carrier 120. In still another implementation, network 130 may include one or more servers, network devices, and/or combinations of networks (e.g., a telephone network, such as the Public Switched Telephone Network (PSTN) or a cellular telephone network) that provide domestic switching services.

Network device 140 may include a data transfer device, such as a gateway, a router, a switch, a firewall, a bridge, a proxy server, a server, a device providing domestic switching capabilities, or some other type of device that processes and/or transfers data. In one implementation, network device 140 may operate on data on behalf of a network, such as network 130. For example, network device 140 may receive all, or substantially all, data destined for network 130 and/or transmitted by network 130.

PSAP 150 may include one or more entities that are responsible for answering emergency (or 911) calls for emergency assistance from police, fire, and ambulance services. PSAP 150 may include one or more user devices, network devices, and/or other communication devices that service emergency calls. In one implementation, PSAP 150 may receive emergency calls from network 130 via Multi-Frequency (MF) trunks, digital trunks, ISDN User Part (ISUP) trunks controlled by the SS7 protocol, basic 911 trunks, E911 trunks, etc. In another implementation, PSAP 150 may communicate with emergency personnel (e.g., police, fire, and/or ambulance services) (not shown) to provide information associated with emergency calls.

Although FIG. 1 shows exemplary components of network 100, in other implementations, network 100 may contain fewer, different, or additional components than depicted in FIG. 1.

As further shown in FIG. 1, in an exemplary operation, a first user device 110 may initiate a non-emergency (or non-911) call 160 that is received by local exchange carrier 120. Local exchange carrier 120 may forward non-emergency call 160, along with a LEC charge number and a CPN of the first user device 110, to network device 140, as indicated by reference number 161. Network device 140 may complete the call by forwarding non-emergency call 160 and the CPN to a second user device 110, as indicated by reference number 162. Although not shown in FIG. 1, in one implementation, network device 140 may forward the LEC charge number to a billing system so that local exchange carrier 120 may be billed for use of the services provided by network 130 (e.g., by network device 140). In another implementation, network device 140 may provide a CPN screening functionality, which may screen the CPN of the first user device 110 so that the CPN of the first user device 110 will not be provided to the second user device 110.

As further shown in FIG. 1, the first user device 110 may initiate an emergency (or 911) call 170 that is received by local exchange carrier 120. Local exchange carrier 120 may forward emergency call 170, along with a LEC charge number and a CPN of the first user device 110, to network device 140, as indicated by reference number 171. Because the LEC charge number may take precedence over the CPN of the first user device 110 for ANI determination purposes, a customer configuration option may be provided in a switch table associated with network device 140 to ensure that the CPN of the first user device 110 may override the LEC charge number for ANI determination purposes. Network device 140 may use the CPN of the first user device 110 to determine ANI information associated with the first user device 110.

Although not shown in FIG. 1, in one implementation, network device 140 may provide the ANI information to a third party ALI database in order to determine the address associated with the first user device 110. The address may be used by network device 140 to determine a location of the closest PSAP 150 to the first user device 110 so that emergency call 170 may be delivered to the closest PSAP 150. Network device 140 may complete the call by forwarding emergency call 170 and the address information of the first user device 110 to PSAP 150, as indicated by reference number 172. PSAP 150 may, in turn, provide the appropriate emergency services in a timely and efficient manner to the user of the first user device 110.

Figure 2:
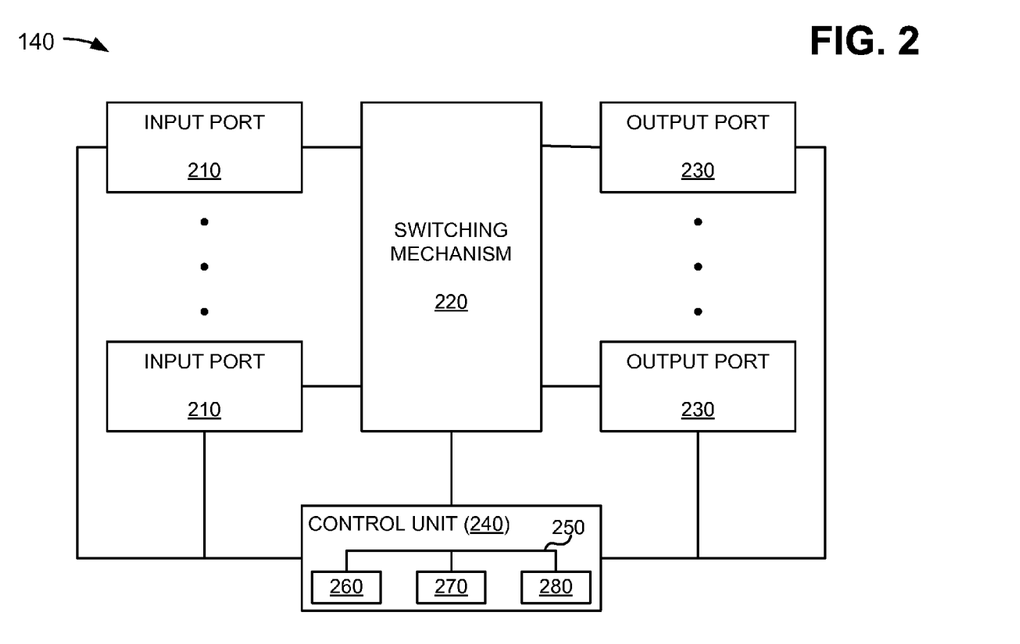
FIG. 2 is an exemplary diagram of the network device of FIG. 1.

FIG. 2 is an exemplary diagram of network device 140. As shown, network device 140 may include input ports 210, a switching mechanism 220, output ports 230, and a control unit 240. Input ports 210 may be the points of attachments for physical links (not shown) and may be the points of entry for incoming service requests (e.g., telephone calls). Switching mechanism 220 may interconnect input ports 210 with output ports 230. Output ports 230 may store the service requests and may schedule the requests for service on one or more output links (not shown). Control unit 240 may use routing protocols and may create and/or maintain a switch table that is used in service forwarding.

Switching mechanism 220 may be implemented using many different techniques. For example, switching mechanism 220 may include busses, crossbars, and/or shared memories. The simplest switching mechanism 220 may be a bus that links input ports 210 and output ports 230. A crossbar may provide multiple simultaneous data paths through switching mechanism 220. In a shared-memory switching mechanism 220, incoming information may be stored in a shared memory and pointers to the information may be switched.

Control unit 240 may interconnect with input ports 210, switching mechanism 220, and output ports 230. Control unit 240 may compute a switch table, implement routing protocols, and/or run software to configure and manage network device 140. In one implementation, control unit 240 may include a bus 250 that may include a path that permits communication among a processor 260, a memory 270, and a communication interface 280. Processor 260 may include a microprocessor or processing logic (e.g., an application specific integrated circuit (ASIC), a field programmable gate array (FPGA), etc.) that may interpret and execute instructions. Memory 270 may include a random access memory (RAM), a read only memory (ROM) device, a magnetic and/or optical recording medium and its corresponding drive, and/or another type of static and/or dynamic storage device that may store information and instructions for execution by processor 260. Communication interface 280 may include any transceiver-like mechanism that enables control unit 240 to communicate with other devices and/or systems.

Network device 140 may perform certain operations, as described herein. Network device 140 may perform these operations in response to processor 260 executing software instructions contained in a computer-readable medium, such as memory 270. A computer-readable medium may be defined as a physical or logical memory device and/or carrier wave.

The software instructions may be read into memory 270 from another computer-readable medium, such as a data storage device, or from another device via communication interface 280. The software instructions contained in memory 270 may cause processor 260 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of network device 140, in other implementations, network device 140 may contain fewer, different, or additional components than depicted in FIG. 2. In still other implementations, one or more components of network device 140 may perform the tasks performed by one or more other components of network device 140.

Figure 3:
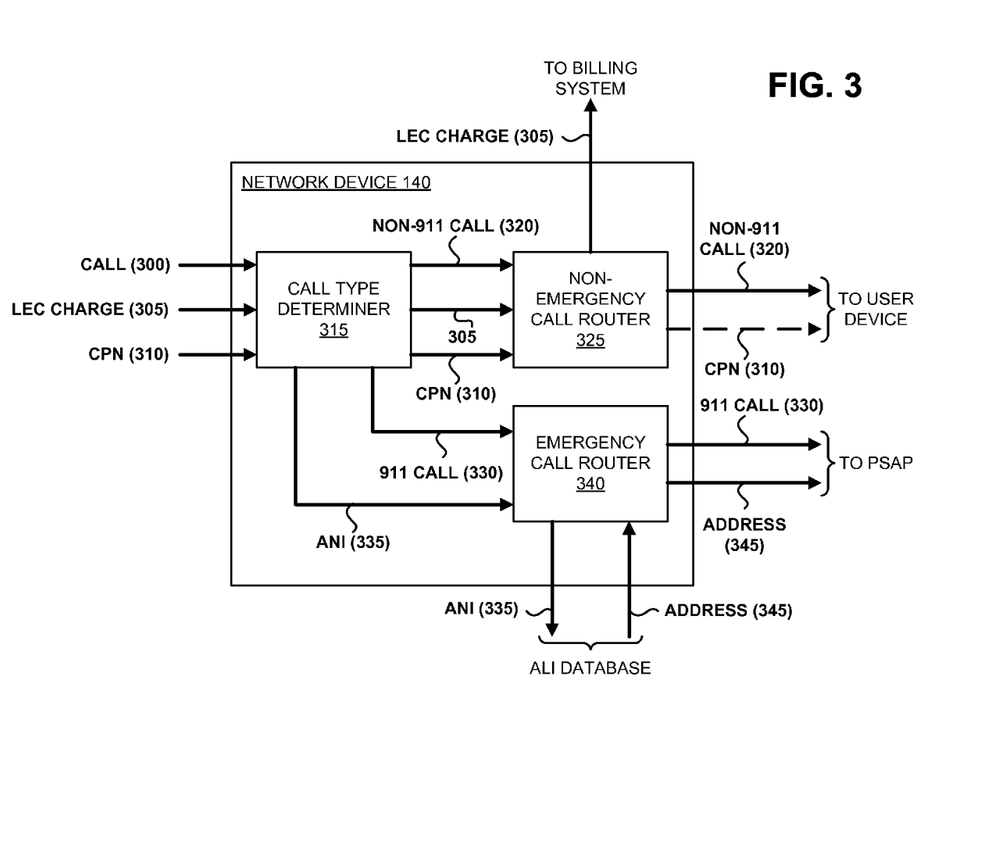
FIG. 3 is an exemplary functional diagram of the network device of FIGS. 1 and 2.

FIG. 3 is an exemplary functional diagram of network device 140. In one implementation, the exemplary functions described in FIG. 3 may be performed in response to processor 260 executing software instructions contained in a computer-readable medium, such as memory 270. In other implementations, the exemplary functions described in FIG. 3 may be performed by hardware and/or a combination of hardware and software provided in network device 140. As shown in FIG. 3, a user may initiate a call 300 via a first user device 110 and local exchange carrier 120 (not shown), and local exchange carrier 120 may provide call 300, a LEC charge number 305, and a CPN 310 associated with the first user device 110 to a call type determiner 315 of network device 140. For example, a user may initiate a non-emergency (or non-911) call or an emergency (or 911) call. Call type determiner 315 may determine a type (e.g., emergency or non-emergency) for call 300, and may use CPN 310 to determine ANI information associated with the first user device 110. A customer configuration option may be provided in a switch table associated with call type determiner 315 to ensure that the CPN 310 may override LEC charge number 305 for ANI determination purposes in the event of an emergency call.

If call type determiner 315 determines that call 300 is a non-emergency type call, call type determiner 315 may provide LEC charge number 305, CPN 310, and/or a non-emergency (or non-911) call 320 to a non-emergency call router 325. In such a scenario, call 300 and non-emergency call 320 may represent the same call. Non-emergency call router 325 may forward LEC charge number 305 to a billing system so that local exchange carrier 120 (not shown) may be billed for use of the services provided by network 130 (e.g., by network device 140). Non-emergency call router 325 may forward non-emergency call 320 and/or CPN 310 to a second user device 110 (not shown) associated with a telephone number used to initiate non-emergency call 320. In an alternative implementation, non-emergency call router 325 may provide a CPN screening functionality, which may screen CPN 310 of the first user device 110 so that CPN 310 of the first user device 110 will not be forwarded to the second user device 110.

If call type determiner 315 determines that call 300 is an emergency type call, call type determiner 315 may provide an emergency (or 911) call 330 and/or ANI information 335 (e.g., based on CPN 310) associated with the first user device 110 to an emergency call router 340. In such a scenario, call 300 and emergency call 330 may represent the same call. Emergency call router 340 may forward ANI information 335 to a third party ALI database in order to determine address information 345 associated with the first user device 110. The third party ALI database may return address information 345 to emergency call router 340. Address information 345 may be used by emergency call router 340 to determine a location of the closest PSAP 150 (not shown) to the first user device 110 so that emergency call 330 may be delivered to the closest PSAP 150. Emergency call router 340 may complete emergency call 330 by forwarding emergency call 330 and address information 345 of the first user device 110 to PSAP 150. PSAP 150 may, in turn, provide the appropriate emergency services in a timely and efficient manner to the user of the first user device 110.

Although FIG. 3 shows exemplary functional components of network device 140, in other implementations, network device 140 may provide fewer, different, or additional functional components than depicted in FIG. 3. In still other implementations, one or more functional components of network device 140 may perform the tasks performed by one or more other functional components of network device 140. For example, in one implementation, call type determiner 315 may provide LEC charge number 305 to a billing system so that local exchange carrier 120 (not shown) may be billed for use of the services provided by network 130 (e.g., by network device 140). In another implementation, call type determiner 315 may provide LEC charge number 305 to emergency call router 340, and emergency call router 340 may forward LEC charge number 305 to the billing system.

Figure 4:
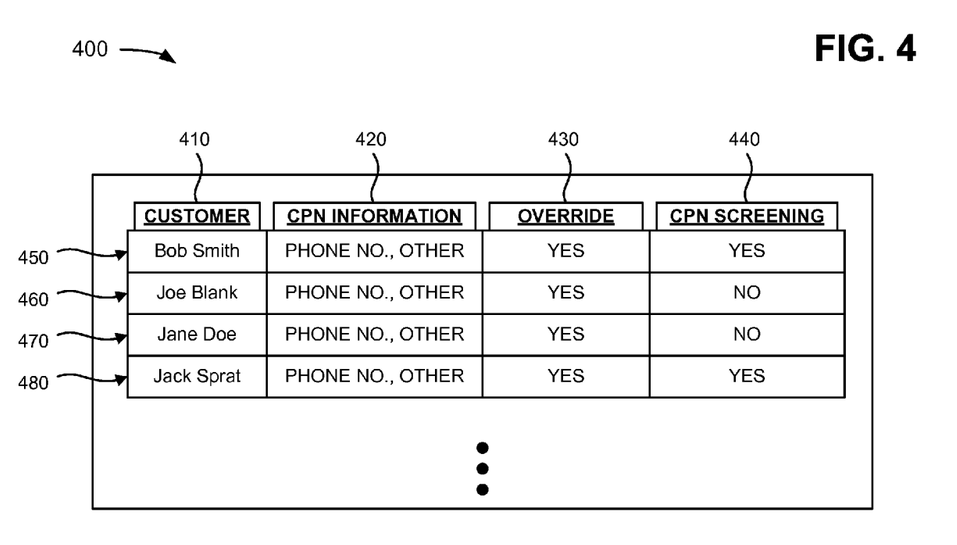
FIG. 4 depicts a diagram of a portion of an exemplary switch table capable of being provided in the network device of FIGS. 1-3.

FIG. 4 depicts a diagram of a portion of an exemplary switch table 400 capable of being provided in network device 140 (e.g., in memory 270 of network device 140). As shown, switch table 400 may include a variety of customer information categories, such as a customer category 410, a CPN information category 420, an override category 430, and a CPN screening category 440. Each customer information category may include multiple customer information-associated records. For example, as shown in FIG. 4, switch table 400 may include a first record 450, a second record 460, a third record 470, a fourth record 480, etc.

Customer category 410 may include the names of customers (e.g., customers associated with local exchange carrier 120). For example, first record 450 may include the name "Bob Smith" under customer category 410, second record 460 may include the name "Joe Blank" under customer category 410, third record 470 may include the name "Jane Doe" under customer category 410, and fourth record 480 may include the name "Jack Sprat" under customer category 410. CPN information category 420 may include the telephone numbers and other information associated with the customers provided in customer category 410. For example, first record

450 may include the name "Bob Smith" and his telephone number under CPN information category 420.

Override category 430 may provide a customer configuration option that ensures that a customer's CPN information may override an LEC charge number for ANI determination purposes in the event of an emergency call. If the override option is provided for a specific customer, override category 430 may provide a "Yes" in switch table 400. For example, in one implementation, first record 450, second record 460, third record 470, and fourth record 480 may include the override option as indicated by the "Yes" under override category 430. In other implementations, the override option may be configurable by the LEC (e.g., by local exchange carrier 120).

CPN screening category 440 may provide a customer configuration option that screens a customer's CPN information for non-emergency calls. If the CPN screening option is provided for a specific customer, CPN screening category 440 may provide a "Yes" in switch table 400. For example, first record 450 may include the CPN screening option as indicated by the "Yes" under CPN screening category 440, second record 460 and third record 470 may not include the CPN screening option as indicated by the "No" under CPN screening category 440, and fourth record 480 may include the CPN screening option as indicated by the "Yes" under CPN screening category 440. If the CPN screening option is not provided for a specific customer, the CPN information associated with the customer may be provided with the customer's calls. CPN screening category 440 may be configurable by users of user device 110, by local exchange carrier 120, and/or by network device 140.

Although switch table 400 depicts four records, in other implementations, switch table 400 may include more or different records than depicted in FIG. 4. Furthermore, switch table 400 may include fewer, different, or additional customer information categories than depicted in FIG. 4. For example, in one implementation, CPN screening category 440 may be omitted, and the information provided under CPN screening category 440 may be generated with the CPN information of a customer.

Figure 5:
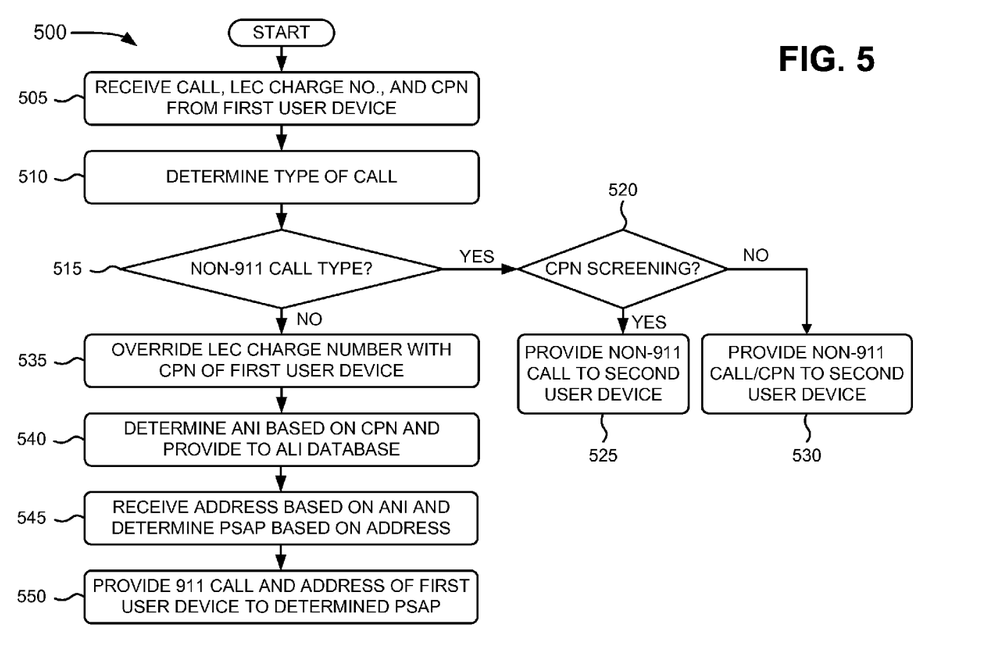
FIG. 5 depicts a flow chart of an exemplary process according to an implementation described herein.

FIG. 5 depicts a flow chart of an exemplary process 500 capable of being performed by network device 140. Process 500 may be performed by one or more hardware and/or software components of network device 140. Alternatively, one or more of the following operations may be performed by a different device. As shown in FIG. 5, process 500 may begin with receipt of a call, a LEC charge number, and/or a CPN from a first user device (block 505). For example, in one implementation described above in connection with FIG. 3, a user may initiate call 300 via the first user device 110 and local exchange carrier 120, and local exchange carrier 120 may provide call 300, LEC charge number 305, and CPN 310 associated with the first user device 110 to call type determiner 315 of network device 140. Call type determiner 315 may, in turn, receive call 300, LEC charge number 305, and CPN 310 associated with the first user device 110.

Process 500 may include determining the type of call (block 510). For example, in one implementation described above in connection with FIG. 3, call type determiner 315 may determine a type (e.g., emergency or non-emergency) for call 300 based on the telephone number dialed by the user.

As further shown in FIG. 5, if the call is a non-emergency call (block 515—YES), process 500 may include determining whether a CPN screening function is enabled (block 520). If the CPN screening function is enabled (block 520—YES), the non-emergency call may be provided to a second user device and the CPN may be screened from the second user device (block 525). For example, in one implementation described above in connection with FIG. 3, if call type determiner 315 determines that call 300 is a non-emergency type call, call type determiner 315 may provide LEC charge number 305, CPN 310, and/or non-emergency call 320 to non-emergency call router 325. Non-emergency call router 325 may forward non-emergency call 320 to the second user device 110 associated with a telephone number used to initiate non-emergency call 320. Non-emergency call router 325 may provide a CPN screening functionality, which may screen CPN 310 of the first user device 110 so that CPN 310 of the first user device 110 will not be forwarded to the second user device 110.

If the CPN screening function is not enabled (block 520—NO), the non-emergency call and the CPN may be provided to the second user device (block 530). For example, in one implementation described above in connection with FIG. 3, if call type determiner 315 determines that call 300 is a non-emergency type call, non-emergency call router 325 may forward non-emergency call 320 and/or CPN 310 to the second user device 110 associated with a telephone number used to initiate non-emergency call 320.

As further shown in FIG. 5, if the call is an emergency call (block 515—NO), the CPN of the first user device may override (i.e., take precedence over) the LEC charge number for ANI determination purposes (block 535). For example, in one implementation described above in connection with FIG. 3, a customer configuration option may be provided in a switch table associated with call type determiner 315 to ensure that the CPN 310 may override LEC charge number 305 for ANI determination purposes in the event of an emergency call.

Process 500 may include determining ANI information based on the CPN of the first user device and providing the ANI information to an ALI database (block 540). For example, in one implementation described above in connection with FIG. 3, call type determiner 315 may use CPN 310 to determine ANI information associated with the first user device 110. Call type determiner 315 may provide emergency call 330 and/or ANI information 335 (e.g., based on CPN 310) to emergency call router 340. Emergency call router 340 may forward ANI information 335 to a third party ALI database in order to determine address information 345 associated with the first user device 110.

As further shown in FIG. 5, an address associated with the ANI information may be received from the ALI database and may be used to determine a PSAP (block 545). For example, in one implementation described above in connection with FIG. 3, the third party ALI database may return address information 345 to emergency call router 340. Address information 345 may be used by emergency call router 340 to determine a location of the closest PSAP 150 to the first user device 110 so that emergency call 330 may be delivered to the closest PSAP 150.

The emergency call and the address of the first user device may be provided to the determined PSAP (block 550). For example, in one implementation described above in connection with FIG. 3, emergency call router 340 may complete emergency call 330 by forwarding emergency call 330 and address information 345 of the first user device 110 to PSAP 150. PSAP 150 may, in turn, provide the appropriate emergency services in a timely and efficient manner to the user of the first user device 110.

Implementations described herein may enable a LEC, with access to a domestic switching network, to deliver address information of a user device to a PSAP in the event of an emergency call from the user device. The CPN of the user device may be used to determine ANI information associated with the user device. The ANI information may be used to look up address information associated with the ANI information in a third party ALI database in order to determine the address associated with the user device. The address may be used to determine a location of the closest PSAP to the user device so that the emergency call is delivered to the closest PSAP. For example, in one implementation, a customer configuration option may be provided in a switch table associated with the domestic switching network to ensure that the CPN of the user device may override a LEC charge number in the event of an emergency call. Such an arrangement may ensure delivery of the user device address information to the correct and closest PSAP in the event of an emergency call by the user device. The PSAP may, in turn, provide the appropriate emergency services in a timely and efficient manner to the user of the user device.

The implementations described herein may permit a larger spectrum of the growing voice over Internet Protocol (VoIP) service LECs to purchase bandwidth from the domestic switching network (e.g., a Class 5 domestic switching network) for time-division multiplexing (TDM) based traffic. Currently, many LECs provide direct trunks to their long distance service provider, as well as dedicated 911 trunks to the PSAPs. The implementations described herein may permit the domestic switching network (e.g., the central office) to be the main emergency calls switching interface for such LECs. This may reduce the additional facility requirements and/or the amount of routing intelligence needed by such LECs.

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 5, the order of the acts may be modified in other implementations. Further, non-dependent acts may be performed in parallel.

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a computing device, the method comprising:
    receiving, by the computing device, an emergency call, a local exchange carrier (LEC) charge number, and a Calling Party Number (CPN) from a user device;
    providing, in a switch table, a customer configuration option;
    implementing, by the computing device, the customer configuration option to override the LEC charge number with the CPN for Automatic Number Identification (ANI) determination purposes;
    determining, by the computing device, the ANI of the user device based on the CPN;
    receiving, by the computing device, an address associated with the user device based on the ANI; and
    providing, by the computing device, the emergency call and the address to a Public Safety Answering Point (PSAP).

2. The method of claim 1, further comprising:
    providing the ANI to an Automatic Location Identification (ALI) database that determines the address associated with the user device based on the ANI.

3. The method of claim 1, further comprising:
    determining the PSAP based on the address associated with the user device.

4. The method of claim 1, further comprising:
    providing the LEC charge number to a billing system that bills a LEC associated with the LEC charge number.

5. A method implemented by a computing device, the method comprising:
    receiving, by the computing device, a call, a local exchange carrier (LEC) charge number, and a Calling Party Number (CPN) from a first user device;
    determining, by the computing device, whether the call is an emergency call or a call destined for a second user device;
    providing, by the computing device, the call to the second user device when the call is determined to be a call destined for the second user device; and
    when the call is determined to be an emergency call:
        providing, in a switch table, a customer configuration option,
        executing, by the computing device, the customer configuration option to override the LEC charge number with the CPN for Automatic Number Identification (ANI) determination purposes,
        determining, by the computing device, the ANI of the first user device based on the CPN,
        receiving, by the computing device, an address associated with the first user device based on the ANI, and
        providing, by the computing device, the emergency call and the address to a Public Safety Answering Point (PSAP).

6. The method of claim 5, where providing, by the computing device, the call to the second user device comprises one of:
    providing the call and the CPN to the second user device when CPN screening is unassociated with the first user device; or
    providing the call to the second user device when CPN screening is associated with the first user device.

7. The method of claim 5, where, when the call is determined to be an emergency call, the method further comprises:
    providing the ANI to an Automatic Location Identification (ALI) database that determines the address associated with the first user device based on the ANI.

8. The method of claim 5, where, when the call is determined to be an emergency call, the method further comprises:
    determining the PSAP based on the address associated with the first user device.

9. The method of claim 5, further comprising:
    providing the LEC charge number to a billing system that bills a LEC associated with the LEC charge number.

10. A device, comprising:
    a memory to store:
        a plurality of instructions, and
        a switch table that includes a customer configuration option; and a processor to execute instructions in the memory to:
receive an emergency call, a local exchange carrier (LEC) charge number, and a Calling Party Number (CPN) associated with a user device,
execute the customer configuration option to override the LEC charge number with the CPN for Automatic Number Identification (ANI) determination purposes,
determine the ANI of the user device based on the CPN,
receive a physical address associated with the user device based on the ANI, and
provide the emergency call and the physical address to a Public Safety Answering Point (PSAP).

11. The device of claim 10, where the processor is further to execute instructions in the memory to:
provide the ANI to an Automatic Location Identification (ALI) database that determines the physical address associated with the user device based on the ANI.

12. The device of claim 10, wherein where the processor is further executes to execute instructions in the memory to:
determine the PSAP located a closest distance from the physical address associated with the user device.

13. The device of claim 10, where the processor is further to execute instructions in the memory to:
provide the LEC charge number to a billing system that bills a LEC associated with the LEC charge number.

14. A device, comprising:
a memory to store:
a plurality of instructions, and
a switch table that includes a customer configuration option; and
a processor to execute instructions in the memory to:
receive a call, a local exchange carrier (LEC) charge number, and a Calling Party Number (CPN) associated with a first user device,
determine whether the call is an emergency call or a call destined for a second user device,
provide the call to the second user device when the call is determined to be a call destined for the second user device, and
when the call is determined to be an emergency call:
execute the customer configuration option to override the LEC charge number with the CPN for Automatic Number Identification (ANI) determination purposes,
determine the ANI of the first user device based on the CPN,
receive a physical address associated with the first user device based on the ANI, and
provide the emergency call and the physical address to a Public Safety Answering Point (PSAP).

15. The device of claim 14, where the processor is further to execute instructions in the memory to one of:
provide, when the call is determined to be a call destined for the second user device, the call and the CPN to the second user device when CPN screening is unassociated with the first user device; or
provide, when the call is determined to be a call destined for the second user device, the call to the second user device when CPN screening is associated with the first user device.

16. The device of claim 14, where the processor is further to execute instructions in the memory to:
provide the ANI to an Automatic Location Identification (ALI) database that determines the physical address associated with the first user device based on the ANI.

17. The device of claim 14, where the processor is further to execute instructions in the memory to:
determine the PSAP located a closest distance from the physical address associated with the first user device.

18. The device of claim 14, where the processor is further to execute instructions in the memory to:
provide the LEC charge number to a billing system that bills a LEC associated with the LEC charge number.

* * * * *